Dec. 8, 1936.                S. S. SEYFERT                    2,063,701
          METHOD OF AND MEANS FOR CONVERTING ALTERNATING
               AND DIRECT CURRENTS ONE INTO THE OTHER
                      Filed Dec. 30, 1931          5 Sheets-Sheet 1

Dec. 8, 1936.  S. S. SEYFERT  2,063,701
METHOD OF AND MEANS FOR CONVERTING ALTERNATING
AND DIRECT CURRENTS ONE INTO THE OTHER
Filed Dec. 30, 1931  5 Sheets-Sheet 2

INVENTOR
Stanley S. Seyfert
BY
Prindle, Bean & Mann
ATTORNEY

Patented Dec. 8, 1936

2,063,701

UNITED STATES PATENT OFFICE 2,063,701

METHOD OF AND MEANS FOR CONVERTING ALTERNATING AND DIRECT CURRENTS ONE INTO THE OTHER

Stanley S. Seyfert, Bethlehem, Pa., assignor to Lehigh University, a corporation of Pennsylvania Application December 30, 1931, Serial No. 583,833

45 Claims. (Cl. 175—364)

The object of this invention is to provide an electrical rectifier of the synchronous mechanical type that will be useful for converting alternating current into direct current or direct current into alternating current. This rectifier is capable of transmitting power in either direction without requiring any adjustments of its mechanical parts. A transition from power flow in one direction to power flow in the other direction can be effected by a mere change of the difference of voltage level on the two sides of the apparatus.

My invention, both as to its method, and mechanical aspects, is capable of embodiment in many different forms, and while in the accompanying drawings I have illustrated my invention by the best embodiments thereof known to me, such embodiments are to be taken as typical only of the many different forms which the invention can take, and my claims are not to be limited thereto.

In the said drawings.

Fig. 2a shows the sequence of connections which are made during the operation of the form of apparatus shown in Fig. 1a.

Figure 1:
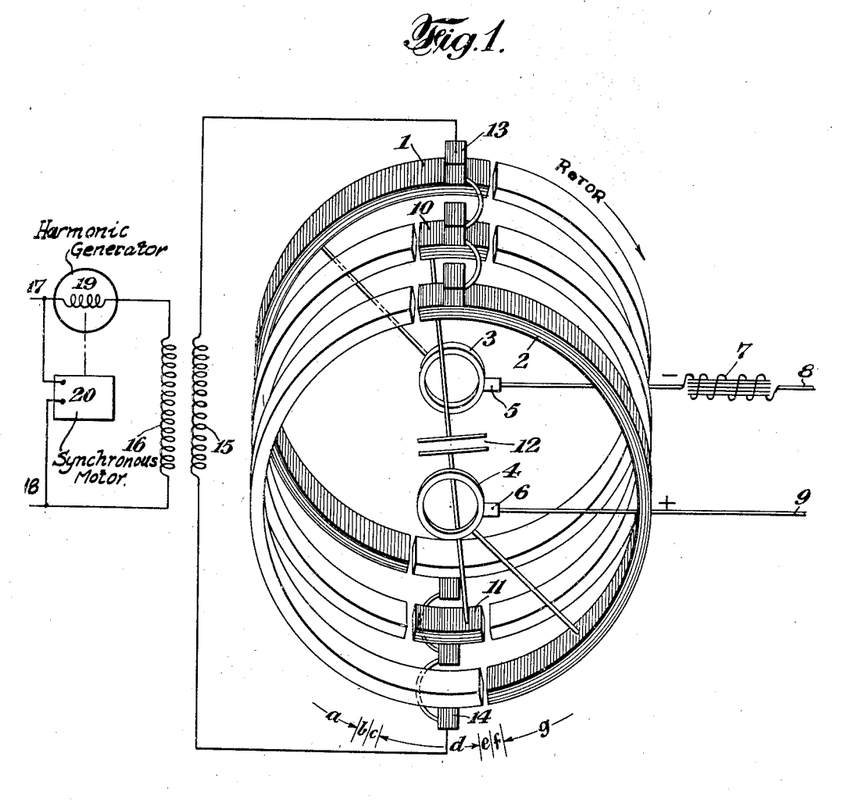
Fig. 1 shows in perspective, and somewhat diagrammatically, the preferred form of commutator, and brush sets, and shows diagrammatically the essentials of a reversible synchronous mechanical rectifier, embodying my invention, and practicing my method. The live segments and the brush sets in the said figure are shaded, the non-conductive segments being without shading.

A description of the fundamental elements of this rectifying apparatus may be best made by referring to Fig. 1 which shows three tiers of metal contact segments which are assumed to be suitably mounted on insulating discs, said discs being mounted on the shaft of the device. The size and axial spacing of these discs will depend upon the capacity of the commutator and the maximum voltages to be handled. In the case of each of the three contact segments, the active or live part of the circumference is shown as shaded. The unshaded parts are to represent blank spaces occupied by insulating material or a series of insulated metal blocks amounting to the same thing.

The segments 1 and 2 are electrically connected to two collector rings 3 and 4 mounted on the shaft (here shown smaller so as not to confuse the figure). Brushes 5 and 6 provide communication with the direct current lines 8 and 9 through a high reactance 7. The object of this reactance is to sustain the flow of direct current during the periods when the alternating current voltage passes through zero. This reactance is not essential when transforming from alternating current to direct current with a rheostatic load but when the direct current wires connect with an excited system (having generators, motors or batteries on it) the reactance is necessary to prevent certain short circuits which the brushes would cause in the operation of the rectifier.

The middle segments 10 and 11 are short and are electrically connected to the terminals of a condenser 12. This condenser is not mounted on the rotor in the actual apparatus but has its connection made through two additional collector rings with their brushes but not shown by the figure.

The brush sets 13 and 14 are carried by a rocker mechanism familiar in connection with other electrical machines. Each brush set has three brushes riding on each of the three tiers of segments. All three brushes of each set are electrically connected together and are held mechanically in line with each other. The brush sets 13 and 14 connect with the secondary coil 15 of the transformer. The primary 16 of the transformer communicates with the alternating current lines 17 and 18 through a harmonic generator 19 driven by a suitable synchronous motor 20 which derives its power from the alternating current system to which the lines 17 and 18 lead. The function of the harmonic generator will be described later.

Description of operation

Figure 1A:
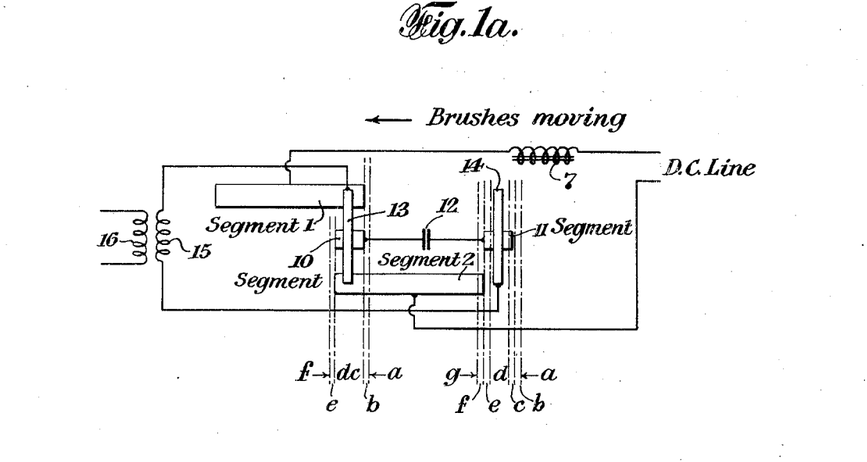
Fig. 1a shows the apparatus in another more simplified diagrammatic form than that shown in Fig. 1.
Figure 2:
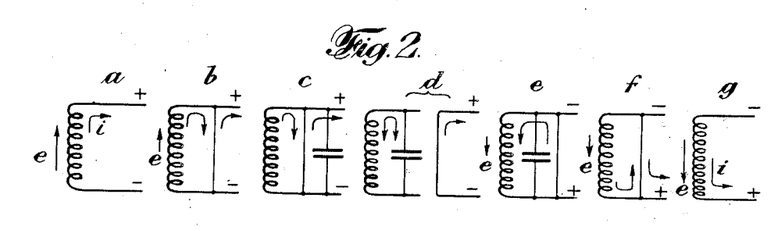
Fig. 2 shows diagrammatically the sequence of relative connections effected by the apparatus of Fig. 1.
Figure 2A:
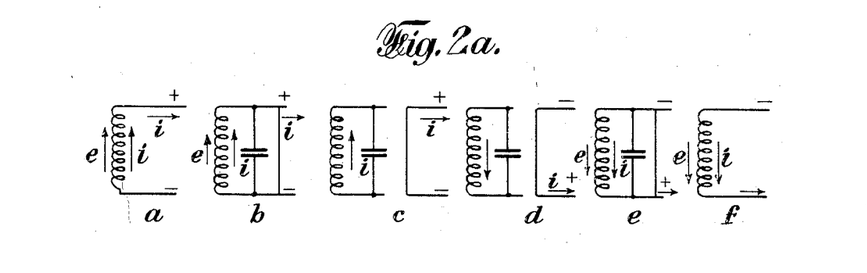

To study the sequence of connections made by the action of the triple brush sets 13 and 14, reference is made to Figs. 1, 1a and 2a. Fig. 2a represents the simpler sequence obtaining when the short circuit and the connection of the condenser are assumed to begin at the same time.

In Fig. 1, the rotor carrying the segments in actual practice would be rotating in a clockwise direction. The study of the sequence of connections, however, may be facilitated by imagining the rotor as stationary and the brushes as moving in a counter-clockwise direction, as the relative motion between the said parts is the same in both cases.

Beginning with brush 14 in the region marked a in Figs. 1 and 1a, the period a represents the period during which the brush 13 contacts with segment 2, only, and brush 14 contacts with segment 1, only. This connects the secondary coil 15 of the transformer with direct current lines 8 and 9 and permits the passage of power from the former to the latter. The period b is the period of short-circuiting of the alternating current system as determined by the width of the brush and the length of the main segments. During the period b, the direct current system also is short-circuited, through the contact of the brush 13 with the segments 1 and 2. The period cd is the period during which the un-short-circuited alternating current system is connected across the condenser. The period e is a short-circuit period of the alternating current system, similar to the period b; and the period f is the period of connection of the alternating current system to the direct current system in reversed sense.

For the period a, starting with the triple brush 14 in the region marked a in Fig. 1, and brush 13 diametrically opposite, the connection is as follows:

From the direct current line 8 to the ring 3, to the segment 1, to the brush 14, to the lower terminal of transformer coil 15, to the brush 13, to the segment 2, to the ring 6, to the direct current line 9. Thus the direct current line 9 connects with the upper transformer terminal. This is indicated by a of Fig. 2a and constitutes a working period.

For the period b, the circuit is as follows:
When a brush 13, in Fig. 1a, starts touching the segment 1 and the short condenser segment 10, and the lower brush 14 touches the segment 11, brush 13 touches segment 1 before brush 14 has left it. This produces the short circuiting of the transformer of Fig. 2a (b). Since the segments 1 and 2 are now both in communication with the same brush set 13, the direct current system also is short circuited. These connections, of Fig. 2a (b), last for a comparatively short period. The short circuiting of the direct current system continues as long as brush 13 connects segments 1 and 2.

For the period c—d, the circuit is as follows:
When the brush 14 breaks contact with the segment 1 and the brushes occupy the position drawn in Fig. 1, the connections c and d of Fig. 2a obtain. The condenser 12, connected between short segments 10 and 11, is obviously across the transformer, while the direct current still flowing in the system passes unobstructed and un-influenced via line 9, ring 4, segment 2, brush 13, segment 1, ring 3 to line 8.

The arc (d) indicated in the lower part of Fig. 1 represents the commutation period during which period the condenser 12 is connected across the transformer coil 15 so that part of a free oscillation may take place between the coil and the condenser, whereby the current in the coil may be effectually reversed in direction. The short periods e and f on one side of d, and c and b on the other side of d represents the times when a short-circuit of coil 15 occurs and the removal or reinsertion of the coil 15 to the D. C. circuit is in progress.

For the period e, the circuit is as follows:
When brush 14 begins to touch segment 2 while brush 13 is still on segment 1, another short-circuit, quite similar to that of b, described before, occurs. This short-circuit insures the discharge of the condenser before it goes out of operation for the time being.

For the period f, the circuit is as follows:
When brush 14 parts contact with segment 11 and brush 13 contacts with segments 10 and 3, the condenser is removed, and the short circuit of the direct current and alternating current systems is lifted, resulting in the connection f of Fig. 2a. Now the positive direct current line 9 connects to the ring 4, to the segment 2, to the brush 14, to the lower transformer terminal, to the brush 13, to the segment 1, to the ring 3, and to line 8. Comparison with the connection a above shows a reversal of sense in connection of transformer to direct current lines.

The oscillation cycle between coil and condenser

When the transformer coil 15 having an inductance (L) and carrying a current (I) thus representing a kinetic energy of $1/2LI^2$ is suddenly connected across the empty condenser of capacity C, a transfer of energy takes place which results in potential energy accumulating in the condenser expressed by $1/2CE^2$; then a rebound occurs which results in a reversed current in the coil which may be nearly equal in magnitude to the original positive current. The natural frequency of this oscillation is expressed by the formula $$f = \frac{1}{2\pi\sqrt{LC}} \text{ (Square root of } LC\text{)}$$

where $f$ = frequency of oscillation.
L = inductance of A. C. system in henries.
C = capacitance of condenser in farads.
Pi = ratio of diameter to circumference of a circle.

During the free oscillation period of the coil condenser circuit we wish to obtain just one half cycle. Let it be assumed that the rectifier is driven at a speed of 3600 R. P. M. corresponding to a frequency of 60 cycles per second and that the free period provided by the operation of the contacts extends over 14 degrees. Then one cycle for the coil condenser circuit would correspond to 28 degrees and the natural frequency of this circuit should be $$\frac{360}{28} \times 60 = 771$$

cycles per second.

The inductance L is obtained by determining the leakage reactance of the transformer and adding to this any other reactances in the alternating current system through which the current must flow. All these reactances must be reduced to the same voltage base by a process well known to the electrical art. The total reactance ($X_t$) thus found may now be reduced to a corresponding inductance $L_t$ to be used in the above expression. From this expression the value of the condenser capacity C may be found.

When the correct condenser capacity (C) has been found and applied, the reversal of current will be substantially correct for any value of load. Greater loads will, however, result in higher voltage amplitude across the condenser. The dielectric strength of the condenser should therefore be adjusted to the needs of the highest values of current to be handled.

*Converting from alternating current into direct current*

Figure 5:
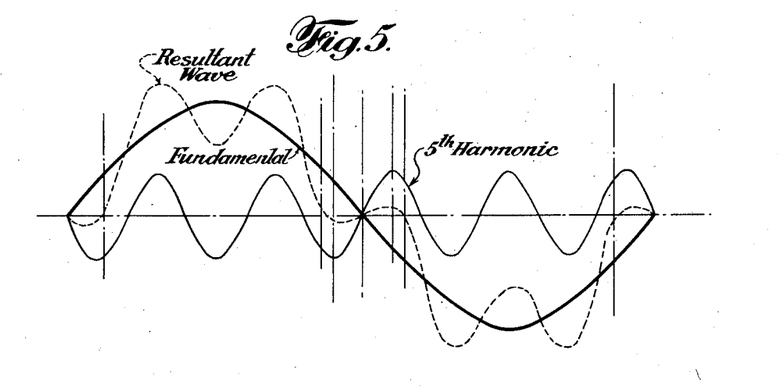
Fig. 5 shows the resulting wave which is obtained by the introduction of the negative fifth harmonic of suitable amplitude, producing practically zero voltage during the two short circuit periods which occur in the use of the apparatus of Fig. 1.

Assuming, in Fig. 1, a sinusoidal voltage to be supplied by lines 17 and 18, the harmonic generator 19 driven by the synchronous motor 20, modifies this voltage form to that of the dotted wave of Fig. 5. The amount of this modification may be varied by controlling the strength of the field of generator 19. This modified wave form is impressed on the primary coil 16 of transformer. The secondary coil 15 impresses a higher voltage across the brushes 13 and 14, but of the same general form, so that the dotted curve of Fig. 5 may be taken to represent the alternating current voltage impressed across the rectifier element. The manner in which the connections of the transformer to the direct current 8—9 are reversed twice during each cycle has been described. When in operation, we find in succession:

1. A working period corresponding to say the positive wave of A. C. voltage (a) in Fig. 1 and Fig. 3 during which the current in the transformer coil 15 will be the same as the direct current, since coil 15 is connected directly into the direct current circuit. When the direct current is held constant by the reactance 7, the current in coil 15 will be similarly constant.

2. A short-circuit period (b+c) during which the D. C. circuit is short circuited as is also the transformer coil 15. If any voltages are still active in coil 15 at this time, there will be a momentary increase of the coil current before the reversing process begins. When the voltage is modified by the harmonic as in Fig. 5 thus causing very low voltage in coil 15 during this period, this momentary increase of current practically disappears.

3. A free oscillation period (d) during which the condenser is connected across the transformer and the two electrically removed from the D. C. circuit and therefore not affected by it. This period is represented by the actual brush position of Fig. 1. The inductance (L) of the A. C. system (coil 15) is connected in series with the capacitance (C) of the condenser (12) through the help of brushes (13 and 14), thus constituting an oscillatory circuit. During this period the reversal of current in coil 15 described previously and shown at the center of Fig. 3 takes place.

4. A short-circuit period *ef*. This is similar to period *bc*. If negative voltage is acting, an overshoot of current is liable to take place. If the neutralization of voltage of Fig. 5 is perfect, this overshoot does not take place.

5. The negative working period *g* begins when the brushes land fully on the main segments 1 and 2 and the condenser and short-circuit have been completely removed. Now both voltage and current are negative which means positive power, as was the case for the positive working period of 1 above.

We have therefore a succession of positive power pulses, one for each half cycle of alternating current voltage. This operation (rectification) implies a somewhat higher voltage on the alternating current side than on the direct current side. For this purpose, the average alternating current voltage is compared with the direct current voltage. When these two voltages are equal, no power passes.

Figure 3:
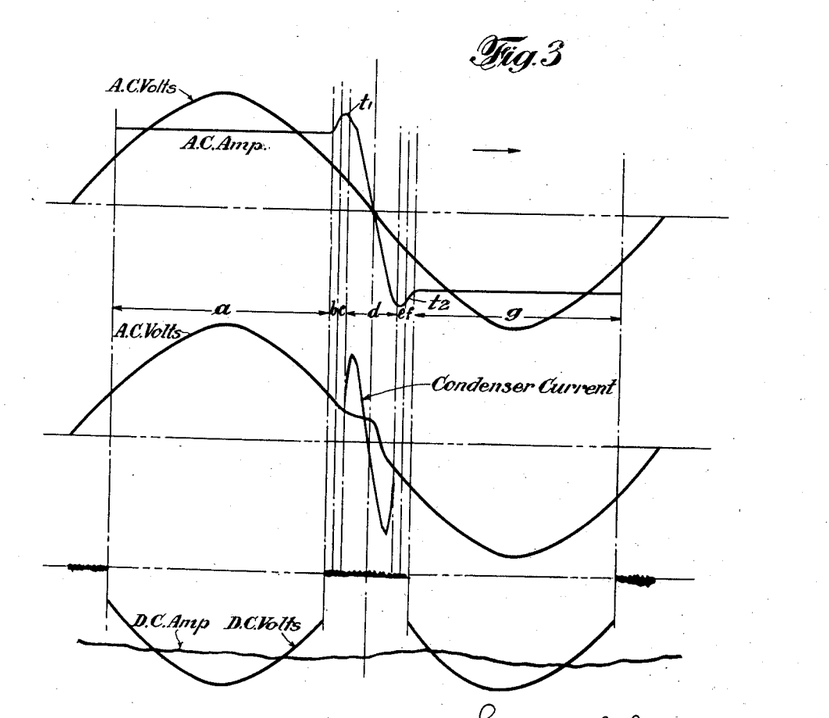
Fig. 3 shows the curves for the alternating and direct currents and voltages when said apparatus is converting alternating current into direct current, according to the aforesaid sequences of connections.

Fig. 3 shows the typical forms of the curves of alternating current volts, alternating current amperes, condenser current, direct current volts and direct current amperes when a single phase rectifying unit of this type is passing power from alternating current to direct current, a steadying reactance being used to maintain practically constant direct current. The direct current load may be either a rheostat or an active direct current system. The duration of the connection periods (a to g, Fig. 2) are indicated with some degree of exaggeration.

The alternating current voltage is represented as sinusoidal.

The alternating current in transformer coil (15) remains substantially constant during period (a), corresponding to connection a in Fig. 2.

During period (b) there is an increase of the alternating current because of the short circuiting of the alternating current voltage which still has considerable value.

The connection of the condenser during period c produces no change in the electric conditions in either the D. C. or A. C. systems since both of these are still short circuited.

During period (d), the short circuiting on the transformer being removed and the direct current lines disconnected, the oscillation cycle previously described takes place. The middle part of Fig. 3 shows the condenser current and the modification of the alternating current voltage, because of charges on condenser. It should be noted, when the apparatus is inverting, that the A. C. voltage still obtaining, when reversal is to begin causes an acceleration of current in the wrong or undesired direction during the first half of the short-circuit period but in the right direction during the second half of the period. Although it has been found that this residual A. C. voltage does not harmfully interfere with the transformation from direct to alternating current it is highly desirable to have the A. C. voltage as nearly zero as possible at the instant commutation begins.

During the periods (e and f) the coil current in 15 adjusts itself to the direct current. When the condenser is removed we have reached period (g) the second half cycle of power transfer.

A backward shift of the brushes will increase the height of the tit $t_1$ of the alternating current wave and reduce the tit $t_2$; in fact, $t_2$ may be caused to disappear in this way.

The direct current voltage consists of a series of sinusoidal pulses with the low voltage values chopped off by the commutating period.

The omission of the steadying reactance on the direct current side will result in a pulsating direct current corresponding somewhat in wave form to the voltage; it will also greatly reduce the duty of the reversing condenser. The reactance is recommended, however, because the ideal direct current aimed at is one steady in value i. e. as free of ripples as possible.

Inversion or conversion of direct current into alternating current

Figure 4:
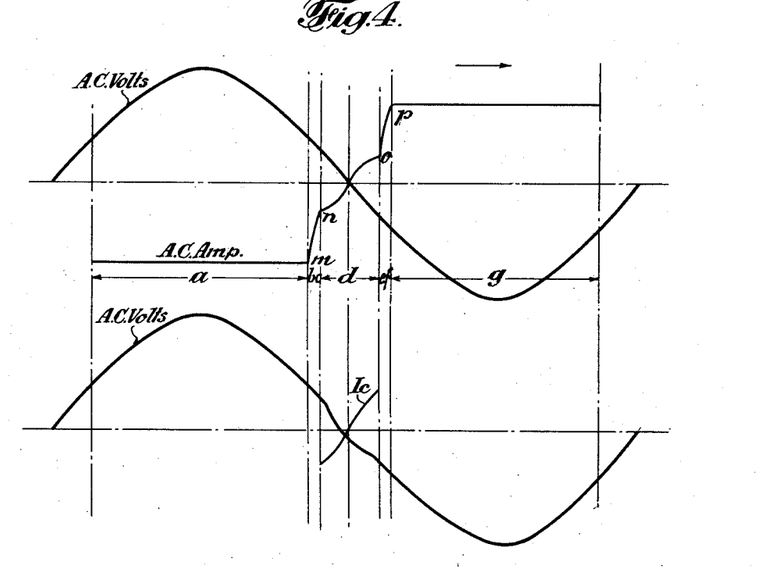
Fig. 4 shows the current and voltage wave forms when the apparatus of Fig. 1 is used to convert direct current into alternating current.

Starting with the condition of balance between the alternating current and direct current voltages, let it be assumed that either the direct current voltage is raised or the alternating current voltage lowered. The currents flowing will now be in the opposite direction, as shown in Fig. 4, i. e. in the transformer, there is phase opposition of voltage and current and the flow of power is negative or in the opposite direction, from direct current to alternating current. The alternating current waves will again assume an approximately rectangular form when the direct current is maintained at a steady value by a reactance, or, if this reactance be small or absent entirely, the tops of the alternating current waves will reproduce the form of the direct current flowing during the period. During the active part of the cycle the alternating current remains substantially constant by virtue of the steadying reactance in the direct current line. Could the small alternating current voltages occurring during the commutation period be ignored, the reversal of current in the transformer would be carried out in precisely the same manner as was found in the alternating current to direct current conversion. These small voltages, however, are inimical to the proper functioning of the transformer-condenser circuit. Thus, during the short circuit period, the negative alternating current decreases rapidly under the influence of the positive voltage and the effect of the natural decrement factor of the circuit. It thus quickly passes from $m$ to $n$ (Fig. 4). The condenser now makes a reversal from $n$ to $o$ but the transition from $o$ to $p$ must be made under conditions that may be harmful to the apparatus.

When the alternating current voltage is properly neutralized as in Fig. 5 very little change in current occurs during the short-circuit periods $bc$ and $ef$; but the reversal by oscillation takes place precisely as for the case of rectification.

The change from rectification to inversion may be effected by a mere change of the voltage and without any change of brush position or any other adjustment.

Both the single-phase (one element) and the 3-phase (3 element) arrangements of this device have been proved by tests to be completely operative and successful as to sparkless operation. The oscillograms taken reveal a remarkable smoothness in the current forms during reversal and there is a complete absence of sparking.

Modification of the alternating current wave form

The difficulties mentioned in the preceding paragraph are here overcome by so modifying the alternating current wave form as to provide a period of nearly zero voltage extending over the commutation period. This is accomplished by superimposing an odd negative harmonic voltage on the fundamental. This can easily be done by connecting in series with the alternating current supply, a generator of higher frequency synchronously driven from the alternating current system on which the rectifier operates. The odd harmonics such as the 3rd, 5th, 7th, 9th, etc. would all be useful. Of these, the 5th harmonic appears especially advantageous because this harmonic reduces to zero on the direct current side when three elements of a three phase rectifier are operating in series. Thus an undesirable direct current ripple is avoided. The resulting wave form obtained by the introduction of the 5th harmonic of suitable amplitude is shown in Fig. 5 which indicates practically zero voltage during the two short circuit periods.

This rectifier when supplied by a properly modified voltage wave as here described is capable of passing power to its full capacity in either direction and can serve as a connecting link between a constant potential alternating current, and a constant potential direct current system. Power will pass from the system which is at a comparatively higher voltage level to the system of lower voltage level.

Application to three phase system

In the preceding discussion, I have limited myself to the operation of a single element of this rectifier such as would be used in connection with a single phase to direct current conversion.

Three of these elements mounted on the same shaft with 120 degrees angular displacement one ahead of or behind the other (the brushes of the three elements being assumed as placed in the same plane), or three of the elements mounted with the commutator points in the same plane and their respective brush sets properly angularly displaced, and driven by a two pole synchronous motor supplied from the alternating current system will serve to convert from 3 phase to direct current or vice versa.

Figure 6:
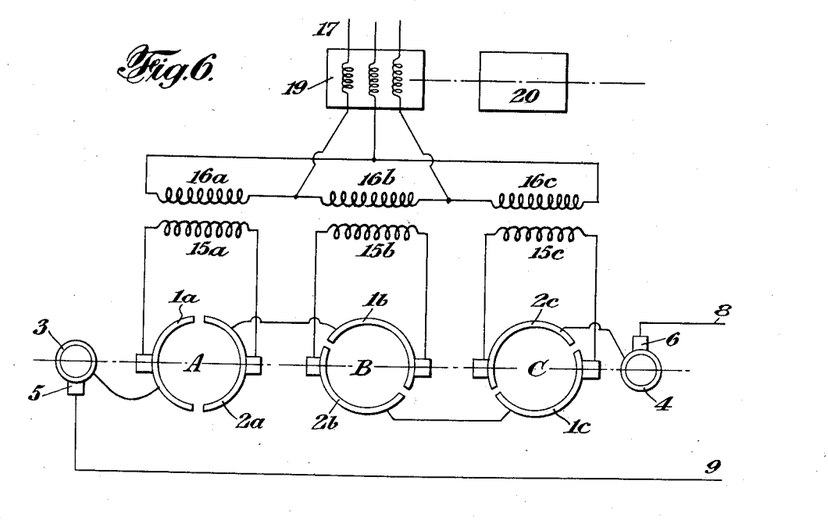
Fig. 6 is a diagrammatical view of the application of my invention to a three-phase system.

The arrangement is shown schematically in Fig. 6 where A, B and C represent the three elements. Segments $1a$ and $2a$ are the two segments of the three disc device shown and similarly numbered in Fig. 1. $16a$ is the primary coil of one of the transformers and $15a$ is the corresponding secondary. $16$, $17$, and $18$ are the three phase alternating current lines.

Segment $2a$ is permanently connected to segment $1b$, $2b$ to $1c$ and $2c$ to collector ring $4$ thru brush $6$ to direct current line $8$. Segment $1a$ connects to ring $3$, brush $5$ and direct current line $9$. These connections are made on the rotor structure.

No attempt is made to show the triple discs of each element nor the application of the condenser as these have been fully set forth previously. It should be stated, however, that a single condenser can be made to serve the three elements in turn because the periods of use of the condenser are quite short and they are equally spaced over the revolution of the apparatus. Since the condenser leaves its working period discharged, there is no objection to using it on the other phases.

If we assume all of the alternating current voltages sinusoidal, the alternating current voltage reaction of the three phase rectifier will be a constant (ignoring the disturbance of the commutation period) and when rectified will serve as an ideal voltage to oppose to the constant voltage of a direct current system.

The steadying reactance (7) of Fig. 1 is now no longer needed because the direct current short circuits necessary during the operation of, say, element A, do not amount to a short of the direct current system because of the active E. M. F.'s of elements B and C. The operation of the single phase element with very high reactance in the direct current lines provides conditions for the element almost identical with those obtaining in the three phase application without the reactance.

Mechanical features

Figure 7:
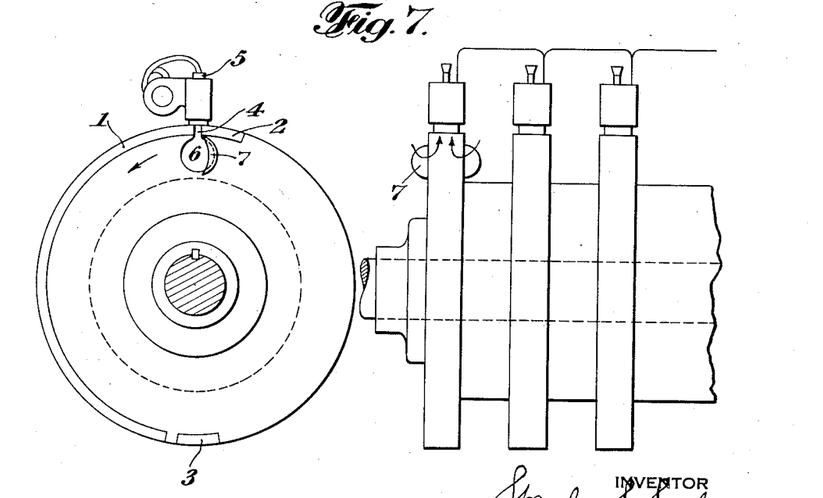
Fig. 7 shows the commutator parts with an arrangement for blowing out sparks which may occur.

A rectifier element of the kind described might be built by using a series of circular discs of insulating material to the periphery of which the active metal segments might be fastened in their proper angular positions. Such an arrangement is shown in Fig. 7. If the blank or dead surfaces of the discs are faced with insulating material, it seems desirable to ensure the easy entrance of the brush on to the active segments by placing a dead or inactive block of the same metal (2 and 3) immediately before and behind the live segment. With the disc running as shown, brush 5 will leave segment 1 and slide on to segment 2. Should any arc persist, it would attach itself to the two segments. Provision is made for the extinguishment of this arc by boring a hole (6) Fig. 7 through the disc and placing cup shaped vanes on either side of disc so as to force air into hole 6 and through slot 4. Since this apparatus operates at a high rate of speed, the air forced through slot 4 should be considerable and assist in extinguishing arcs and in cooling the tips of the segments.

Since any synchronous rectifier, however carefully adjusted may have to operate under abnormal conditions at times which may result in some sparking, it seems desirable to use every means to suppress such sparking. Therefore the placing of the commutator together with its synchronous driving motor in a tank containing hydrogen is suggested. This hydrogen atmosphere, because of its steep voltage current characteristic, will greatly assist in extinguishing or quenching the sparks. An incidental advantage of using hydrogen in this way is the reduction of windage losses and the improved convection conditions for removal of heat. There are other media such as illuminating gas which could be used to approximate the effects of hydrogen. Immersion of the rectifier in oil may also be resorted to if sparking troubles prove to be serious.

The steps of my method, while enumerated separately, can some of them be performed simultaneously, or the order in which they are performed can otherwise be changed. Thus, for instance, as shown in Fig. 1a and as above stated, the condenser may be connected with the coil at the same time that the short circuits of the coil and direct current lines begin. My claims are, therefore, not to be limited in these respects, unless expressly so stated.

I claim:—

1. The method of converting alternating current into direct current comprising inducing alternating current in a coil connected with a direct current circuit, absorbing the energy of said coil as its voltage approaches zero by establishing an oscillating circuit with said coil and reversing the connections of said direct current circuit with said coil, during the time of half a complete oscillation of said circuit.

2. The method of converting alternating current into direct current, comprising inducing alternating current in a coil connected with a direct current circuit, absorbing the energy of said coil as its voltage approaches zero, and restoring said energy to said coil in the reverse direction.

3. The method of converting alternating current into direct current, comprising inducing alternating current in a coil connected with a direct current circuit, establishing an oscillating circuit and a short circuit across said direct current circuit, disconnecting said direct current circuit while still short-circuited, but leaving said oscillating circuit connected to said coil, connecting said direct current circuit and said coil in the reverse relation, while said direct current circuit is still short-circuited, and removing said oscillating circuit, the charging and discharging of said oscillating circuit being effected during said disconnecting, reversal, and reconnecting of said direct current circuit.

4. In an alternating current to direct current rectifier, the combination of an alternating current system, and a direct current system, a transformer connecting said systems, a commutator having two segments, mounted in separate planes and having a pair of brush sets each of which is adapted to contact with both of said segments, means for connecting that coil of the transformer which is on the direct current side with the said brushes or said segments, and means for connecting the direct current lines with the opposite brush set, or segment, said direct current system having a high reactance therein, said commutator having segments in a third plane, an energy-absorbing means being connected to said segments, said brush sets being adapted to contact with said last mentioned commutator segments.

5. In an alternating current to direct current synchronous mechanical rectifier, the combination of an alternating current system and a direct current system, one of said systems comprising a source for generating its kind of current; a transformer connecting said systems, means for connecting an energy-absorbing means to the transformer coil for said system, means for short-circuiting the direct current system, means for disconnecting the direct current system from the transformer energy-absorbing system, while the energy-absorbing means is connected to said transformer, and for reconnecting said direct current system to said transformer coil in the reverse direction, while said energy-absorbing means is being charged and discharged.

6. In an alternating current to direct current rectifier element of the synchronous mechanical type, the combination with alternating current and direct current electric systems of an essentially two part commutator having the two parts or segments mounted in two separate planes removed from each other and a third tier or plane of segments and auxiliary apparatus connected with said commutator and adapted to absorb and restore energy from said alternating current circuit during the period of commutation.

7. In an alternating current to direct current rectifier element of the synchronous mechanical type the combination with an alternating current and a direct current electric system of an essentially two part commutator having the two parts or segments mounted in two separate planes removed from each other and a third tier or plane of segments having a condenser connected thereto for the purpose of introducing the condenser during the period of commutation, and multiple brush sets for so contacting with the three tiers of segments as to cause said condenser as during a period of commutation to absorb and restore energy from said alternating current circuit.

8. In a polyphase apparatus for converting alternating and direct currents, one into the other, the combination with a series connection of single phase converting elements with means for electrically removing each element from the series circuit when the alternating current in such element undergoes commutation, and means for reversing the current in said element while so removed.

9. In a polyphase apparatus for converting alternating and direct currents, one into the other, the combination with a series connection of single phase converting elements with means for electrically removing each element from the series circuit when the alternating current in such element undergoes commutation, and means for reversing the current in said element while so removed, said reversing means comprising a condenser arranged to produce oscillation with the inductance of the alternating current system.

10. The method of securing greater constancy of the direct current output voltage and current of an electrical rectifier by operating the several phase elements of a polyphase rectifier in series in the direct current circuit, removing electrically from the direct current circuit each phase element when such element is to undergo current reversal on its alternating current side, causing current reversal in the element so removed and reinserting said element into the direct current circuit after said current reversal.

11. In an alternating current to direct current or direct current to alternating current synchronous mechanical rectifier or inverter, the combination with an alternating current and a direct current system of an essentially two-part commutator having the said parts or segments mounted in separate planes axially removed from each other and a third tier or plane of segments serving as means for introducing a condenser into the alternating current circuit when the current of said circuit undergoes reversal.

12. The method of converting direct current into alternating current comprising supplying direct current to a direct current circuit, establishing an oscillating circuit, connected with said direct current circuit, and during an oscillation of said oscillating circuit reversing the connections of said direct current circuit with said oscillating current circuit.

13. The method of converting alternating and direct current, one into the other, comprising causing current to flow in a coil connected with the direct current circuit, absorbing the energy of said current by establishing an oscillating circuit with said coil, and reversing the connections of said direct current circuit with said coil, during a half oscillation of said oscillating circuit.

14. The method of converting alternating and direct current, one into the other, comprising causing current to flow in a coil connected with the direct current circuit, absorbing the energy of said current by establishing an oscillating circuit with said coil, reversing the connections of said direct current circuit with said coil during a half oscillation of said oscillating circuit, and, during said half oscillation, providing a period of nearly zero voltage by superimposing an odd negative harmonic voltage on the fundamental.

15. The method of converting alternating and direct current, one into the other, comprising causing current to flow in a coil connected with the direct current circuit, establishing an oscillating circuit with said coil, short circuiting said direct current circuit while said oscillating circuit is connected with said coil, connecting said direct current circuit with said coil in reversed relation while said direct current circuit is still short circuited, and removing said short circuit and said oscillating circuit.

16. The method of converting alternating and direct current, one into the other, comprising causing current to flow in a coil connected with the direct current circuit, establishing an oscillating circuit with said coil, short circuiting said direct current circuit while said oscillating circuit is connected with said coil, connecting said direct current circuit with said coil in reversed relation while said direct current circuit is short circuited, and removing said short circuit and said oscillating circuit during a half oscillation of said oscillating circuit.

17. The method of converting alternating and direct current, one into the other, comprising causing current to flow in a coil connected with the direct current circuit, establishing an oscillating circuit with said coil, short circuiting said direct current circuit while said oscillating circuit is connected with said coil, connecting said direct current circuit with said coil in reversed relation while said direct current circuit is still short circuited, removing said short circuit and said oscillating circuit, during a half oscillation of said oscillating circuit, and maintaining the direct current by introducing a high inductance in the direct current circuit.

18. The method of converting direct current into alternating current comprising causing direct current to flow in a coil connected with the direct current circuit, absorbing the energy of said current by establishing an oscillating circuit with said coil, short circuiting said direct current circuit after a half oscillation of said oscillating circuit, and during said half oscillation reversing the connections of said direct current circuit with said coil.

19. The method of converting direct current into alternating current comprising causing direct current to flow in a coil connected with the direct current circuit, absorbing the energy of said current by establishing an oscillating circuit with said coil, short circuiting said direct current circuit during a half oscillation of said oscillating circuit, and, during said half oscillation, reversing the connections of said direct current circuit with said coil, and, during said half oscillation period, providing a period of nearly zero voltage by superimposing an odd negative harmonic voltage on the fundamental.

20. The method of converting direct current into alternating current, comprising causing direct current to flow in a coil connected with the direct current circuit, absorbing the energy of said current by establishing an oscillating circuit with said coil, short circuiting said direct current circuit during a half oscillation of said oscillating circuit, and during said half oscillation reversing the connection of said direct current circuit with said coil, and, during said half oscillation period, providing a period of nearly zero voltage by superimposing an odd negative harmonic voltage on the fundamental, and maintaining said direct current by introducing a reactance in said direct current circuit.

21. The method of converting alternating current into direct current comprising inducing alternating current in a coil connected with a direct current circuit, absorbing the energy of said coil as its voltage approaches zero by establishing an oscillating circuit with said coil, and reversing the connections of said direct current circuit with said coil during a half oscillation of said circuit.

22. The method of converting alternating current into direct current, which comprises inducing current in means connected with a direct current circuit, short circuiting said means, short circuiting said direct current circuit, establishing an oscillating circuit with said first mentioned means, removing the short circuit of said first mentioned means, disconnecting said direct current circuit from said oscillating circuit while maintaining the short circuit of said direct current circuit, returning the absorbed energy of said oscillating circuit to said first mentioned means, by connecting said direct current circuit to said first mentioned means in reversed direction, and removing the short circuit of said direct current circuit.

23. In an alternating current to direct current mechanical rectifier, the combination of an alternating current and a direct current system, of an essentially two part commutator having said apparatus or segments mounted in separate planes removed from each other, an auxiliary apparatus for completing an oscillating circuit in the direct current circuit, and a third tier or plane of segments, having connections for introducing said auxiliary apparatus during the period of commutation.

24. In a synchronous mechanical rectifier for converting alternating and direct currents, one into the other, the combination with means for synchronously reversing the connections between the A. C. and D. C. systems, and means for so superimposing an odd negative harmonic of voltage upon the fundamental voltage as to bring the fundamental voltage substantially to zero.

25. In a synchronous mechanical rectifier converting either from alternating to direct current or from direct current to alternating current, the combination with means for synchronously reversing the connections between the A. C. and D. C systems, of means for so superimposing an odd negative harmonic of voltage upon the fundamental voltage as to bring the fundamental voltage substantially to zero.

26. The method of converting alternating and direct current one into the other and vice versa, comprising securing sparkless commutation by the electrical separation of the A. C. and D. C. systers by effecting a common short circuit, and simultaneously reversing the current of the A. C. system by causing a half cycle of oscillation to take place during said short circuit and then removing said short circuit.

27. The method of converting alternating current into direct current, and vice versa comprising inducing alternating current in a coil connected with a direct current circuit, absorbing the energy of said coil as its voltage approaches zero by establishing an oscillating circuit with said alternating current coil, and reversing the connections of said direct current circuit with said coil during the time of half a complete oscillation of said circuit and then removing said short circuit.

28. In a synchronous mechanical rectifier, the combination with a polyphase source of alternating current and a direct current source, of a plurality of rectifying units driven in unison by a synchronous motor, said units having their respective brush sets with an angular displacement with respect to each other, and each having an oscillating circuit, and means for reversing the connection of each said circuit with the direct current circuit.

29. In a synchronous mechanical rectifier, the combination with a polyphase source of alternating current and a direct current source, of a plurality of rectifying units driven in unison by a synchronous motor, said units having their respective brush sets with an angular displacement with respect to each other, and each having an oscillating circuit, and means for reversing the connection of each said circuit with the direct current circuit, when the A. C. voltage approaches zero.

30. In a synchronous mechanical rectifier or inverter, the combination with a polyphase source of alternating current supply, and a direct current circuit, of a plurality of rectifying units driven in unison by a suitable synchronous motor, said units being angularly displaced with respect to each other, combined with means for effecting reversal of the currents in the phases of the polyphase A. C. system during short circuiting periods occurring at or near the time when the respective polyphase electromotive forces pass through zero, said reversing means comprising an oscillating circuit and means for reversing the connection of said circuit with said direct current circuit.

31. In a synchronous mechanical rectifier or inverter, the combination of means for generating a fundamental alternating voltage wave, a capacitance, and means for combining with said alternating-voltage wave of fundamental frequency, one or more odd harmonics of voltage so phased as to produce a low resultant alternating voltage during the time when commutation of the alternating current takes place.

32. The method of converting alternating current into direct current, comprising inducing a current in a coil connected with a direct current circuit, establishing an oscillating circuit with said coil, and short-circuiting said direct current circuit, and reversing and reconnecting said direct current circuit, during a half cycle of the free oscillation period of the coil-condenser circuit, and then removing said short circuit.

33. In a synchronous mechanical rectifier comprising an alternating current circuit and a direct current system, a condenser, means for introducing said condenser into the circuit whose current is to be reversed, during the periods when such reversal is desired, and means for removing said condenser from said circuit during other periods.

34. The method of effecting commutation for current reversal in a synchronous mechanical rectifying or converting apparatus, which apparatus comprises an alternating current system, a direct current system, an inductance in the circuit in which the current is to be reversed, a capacitance, and means for connecting said capacitance across said inductance, said method comprising causing a half cycle of oscillation of the alternating circuit to take place in said capacitance, and during said oscillation, disconnecting said capacitance from said inductance, and then reversely connecting said capacitance thereto.

35. In a synchronous-mechanical rectifier-inverter, the combination of an alternating current system and a direct current system with means for periodically removing the alternating current system from the direct current system, a condenser, and means for connecting and disconnecting said condenser across the alternating current, an inductance of the alternating current system, said condenser being so proportioned as to its capacitance that the current in the alternating current system shall be reversed during the period of removal.

36. In a synchronous-mechanical rectifier comprising an alternating current system and a direct current system, the combination of a condenser, means for introducing said condenser into that circuit whose current is to be reversed, during the periods when such reversal is desired, and for removing the condenser from said circuit during other periods.

37. In a synchronous-mechanical rectifier for converting alternating and direct currents, one into the other, the combination of a capacitance with means for synchronously reversing the connections between the alternating and direct current systems, and means for so superposing the third harmonic of voltage upon the fundamental voltage as substantially to counteract any voltage of the fundamental A. C. supply at the point of reversal.

38. In a device for transforming alternating and direct current, the one into the other, the method of securing favorable voltage conditions during commutation, which comprises so combining an odd multiple harmonic of the fundamental supply voltage with a fundamental supply voltage of the alternating current system as substantially to counteract any voltage of the fundamental A. C. supply at the point of reversal.

39. In a synchronous mechanical rectifier or inverter, the method of securing favorable voltage conditions during commutation which comprises so combining an odd multiple harmonic of the fundamental supply voltage with the fundamental supply voltage of the alternating current system as substantially to counteract any voltage of the fundamental A. C. supply at the point of reversal.

40. In an alternating current to direct current or direct current to alternating current synchronous mechanical rectifier system, including an alternating current source and a direct current source, means for short-circuiting the alternating current and direct current circuits, a capacitance, means for introducing said capacitance into the alternating circuit, means for disconnecting the direct current circuit from the alternating current circuit and for re-connecting the direct current circuit to the alternating current in a reversed sense, means for removing said capacitance from the alternating current circuit, and means for removing the short circuits of the said two circuits.

41. The method of converting alternating and direct currents one into the other comprising causing a reversal of the current of an A. C. system by first absorbing said current in a capacitance and a reactance in said system and subsequently establishing a current reversed in direction in the D. C. system by utilizing the current thus stored in the said capacitance and reactance.

42. The method of converting alternating and direct current one into the other comprising causing a reversal of the current of an A. C. system by first absorbing said current in a capacitance and a reactance in said system and subsequently establishing a current reversed in direction in the D. C. system by utilizing the current thus stored in the said capacitance and reactance, said steps being performed without breaking either system.

43. In a synchronous mechanical rectifier or inverter, the combination with a polyphase source of alternating current supply, and a direct current circuit, of a plurality of rectifying units driven in unison by a suitable synchronous motor, said units being angularly displaced with respect to each other, combined with means for effecting reversal of the currents in the phases of the polyphase A. C. system during short circuiting periods occurring at or near the time when the respective polyphase electro-motive forces pass through zero, said reversing means comprising an oscillating circuit and means for reversing the connection of said circuit to said direct current circuit.

44. In a device for transforming alternating and direct currents, one into the other, requiring the use of short circuit apparatus during commutation, the method of producing favorable conditions for commutation by superposing a negative odd harmonic of voltage upon the fundamental supply voltage.

45. In a synchronous mechanical device for transforming alternating and direct currents one into the other, requiring the use of short circuit apparatus during commutation, the method of producing favorable conditions for commutation by superposing an odd harmonic of voltage upon the fundamental supply voltage.

STANLEY S. SEYFERT.